United States Patent
Li et al.

(10) Patent No.: US 7,457,537 B2
(45) Date of Patent: Nov. 25, 2008

(54) OPTICAL TELECOMMUNICATION SYSTEM WITH AUTOMATIC CHANNEL SWITCHING

(75) Inventors: Ho-Shan Li, Kaohsiung (TW);
Fu-Chun Hung, Tai-Nan Hsien (TW);
Yao-Wei Kuo, Tai-Nan (TW)

(73) Assignee: Technology Thesaurus Corp., Kaohsiung (TW)

( * ) Notice: Subject to any disclaimer, the term of this patent is extended or adjusted under 35 U.S.C. 154(b) by 435 days.

(21) Appl. No.: 11/244,232

(22) Filed: Oct. 6, 2005

(65) Prior Publication Data

US 2007/0081822 A1   Apr. 12, 2007

(51) Int. Cl.
*G02F 1/00* (2006.01)
*G02F 2/00* (2006.01)
*H01S 3/00* (2006.01)
*H04B 10/00* (2006.01)
*H04J 14/00* (2006.01)

(52) U.S. Cl. ............ 398/5; 340/825.01; 370/227; 714/4

(58) Field of Classification Search ............ 398/1, 398/2, 5, 9, 12, 19; 356/73, 477
See application file for complete search history.

(56) References Cited

U.S. PATENT DOCUMENTS

| | | | |
|---|---|---|---|
| 5,778,116 A | * | 7/1998 | Tomich ............ 385/16 |
| 6,421,149 B2 | | 7/2002 | Tervonen et al. |
| 2003/0035175 A1 | | 2/2003 | Wu et al. |

* cited by examiner

*Primary Examiner*—Kenneth N. Vanderpuye
*Assistant Examiner*—Cody W Lamb
(74) *Attorney, Agent, or Firm*—Bacon & Thomas, PLLC

(57) ABSTRACT

An optical telecommunication system with automatic channel switching is disclosed. The system is provided with two symmetrical fiber channels and two subsystems. Each subsystem is formed by two 2×2 optical switches that are connected to each end of the primary and secondary channels, including an input light source, an optical receiver, multiple fiber optic power meters, and a control circuit. Data signals are normally sent over the primary channel, while test signals are passed through the secondary channel. The fiber optic power meters are connected to the receiving ends to monitor the power level of transmitted signals over the two channels simultaneously. If a line disconnection is detected, the control circuit automatically initiates a channel switching between the primary channel and secondary channel, and yet optical signals are transmitted and received transparently with high efficiency and reliability.

9 Claims, 8 Drawing Sheets

OPTICAL TELECOMMUNICATION SYSTEM WITH AUTOMATIC CHANNEL SWITCHING

BACKGROUND OF THE INVENTION

1. Field of the Invention

The present invention relates to an optical telecommunication system that is provided with an automatic channel switching mechanism between two symmetrical fiber channels, such that optical signals can be transmitted and received over the communication line transparently with high efficiency and reliability.

2. The Related Art

To increase the data reliability in optical telecommunication, the most common practice is to use multiple fiber channels simultaneously connecting between the transmitting and receiving ends of the communication line. If the telecommunication through one of the fiber channels is disconnected, the system notifies the service personnel who will then try to repair the damaged channel and manually switch the signal transmission path to another open channel.

The data communication may be disrupted, and the response time and manual switching process may hold up the signal transmission for considerable length of time before the communication line can resume its normal service. Consequently someone proposed a technique of automatic channel switching. There are different ways of channel switching, one of which employs a main controller and multiple fiber channels, including a primary channel and a spare channel. If the primary channel is disconnected, the system uses the interconnected signal lines to notify the optical switches on both ends of the communication line to switch to the spare channel simultaneously. However, the cost for establishing extra signal lines is quite heavy, thus many telecommunication system builders are discouraged.

A prior art design disclosed a more economical method, which used an automatic channel switching among multiple fiber channels. When data are transmitted over a fiber channel, the specific fiber channel is systematically locked by the optical switches on two ends, and when no more data are present the optical switches are then be released. The dynamic channel selection process will start again to find another active channel for lock-in. Since the optical switches on both ends are operated independently, this design can avoid the complicated intercommunication on both ends. However, one potential problem is that the optical switches may engage in a 'racing' condition in an attempt to out run each other, thus failing to lock in any one channel. To correct this situation, there shall be a controller to arbitrate over the channel selection.

Another prior design proposed to send put data signals simultaneously on two symmetrical channels at the same time, and the power meters were installed on the receiving end to monitor the power level of transmitted signals. When the power meter detects that one of the two channels has higher power level, the channel will be selected as the working channel and the other channel as the spare channel. This can avoid the complicated intercommunication between the optical switches on two ends and the 'racing' problem. But one of the more serious problems in this case is that the optical switches on two ends may be using different channels to transmit data signals at the same time, so it could be that data were sent out over one channel on one end, while the same channel was being shut down for maintenance.

Moreover, there is another problem commonly shared by all the above schemes from the fact that the spare channel has not been actively monitored. If a line disconnection had occurred over the primary channel, the system that was trying to switch to the spare channel would only find it disconnected.

In these aspects, the optical telecommunication system with automatic channel switching according to the present invention can substantially reduce or obviate the limitations and disadvantages of the prior art.

SUMMARY OF THE INVENTION

The primary object of the invention is to provide an optical telecommunication system having automatic channel switching that enables efficient and reliable optical telecommunication using two symmetrical fiber channels and no use of extra signal lines, because the switch enable signal is embedded in the test signals being transmitted over the secondary channel.

The second object of the invention is to provide an optical telecommunication system having automatic channel switching that enables the system to monitor the signal transmission over the primary and secondary channels at the same time, so the system operator can be swiftly notified to take any corrective action whenever a line disconnection occurs.

The third object of the invention is to provide an optical telecommunication system that is able to support the use of fiber amplifiers as repeater nodes in multi-section communication lines.

To attain the above-mentioned objects, the optical telecommunication system with automatic channel switching is built with two symmetrical fiber channels, represented by primary route (channel) and secondary route (channel), where each channel contains two opposite direction signal transmission paths, and the primary and secondary channels are coupled with two fiber optic switches on both ends. Each end of the communication line has two optical switches with 2×2 architecture, forming a subsystem including an input light source, an optical receiver, multiple fiber optic power meters, and a control circuit.

In the normal conditions, the data signals are sent over the primary channel, while test data are passed through the secondary channel. The fiber optic power meters are installed on the receiving ends of the signal transmission paths to monitor the power level of transmitted signals over the two bi-directional channels. If the primary channel is disconnected, the control circuit will automatically switch over the optical switches to an appropriate operation mode, which is actually achieved by switching between the primary channel and secondary channel.

These along with other features of novelty which characterize the invention, are pointed out with particularity in the claims annexed to and forming a part of this disclosure. For a better understanding of the invention, the operating advantages and the specific objectives attained by its uses, references should be made to the accompanying drawings and descriptive matter illustrated in preferred embodiments of the invention.

DETAILED DESCRIPTION OF THE PREFERRED EMBODIMENT

Referring to FIGS. 1, 2, the present invention employs two 2×2 optical switches on each end of the fiber optic cable, which forms a subsystem on each end. Each subsystem includes two switches having one pair of input ports 1, 1' and one pair of output ports 2, 2'. The signal transmission path in any given time shall be in compliance with one of the two connection patterns shown in FIG. 1. The communication line is composed of two symmetrical fiber channels. Every time when the switch enable signal is issued after a line disconnection is detected, the optical switches are synchronously switched from one operation mode to the other, respectively represented by (1-2, 1'-2') and (1-2', 1'-2), where a-b represents connection from port a to port b.

Figure 1A:
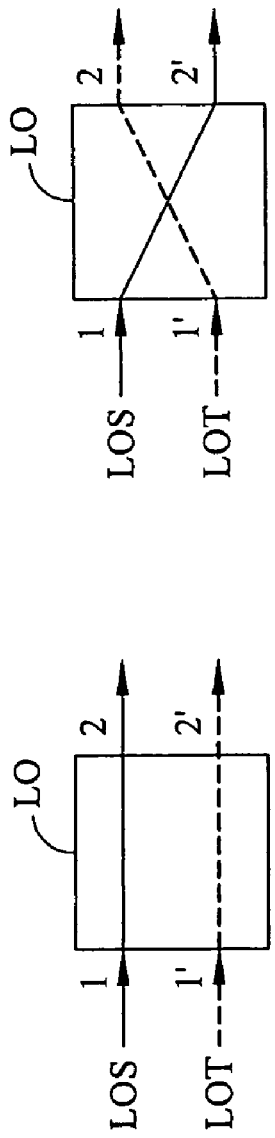
FIG. 1 shows a diagram of the optical switch architecture in accordance with the present invention.
Figure 1B:
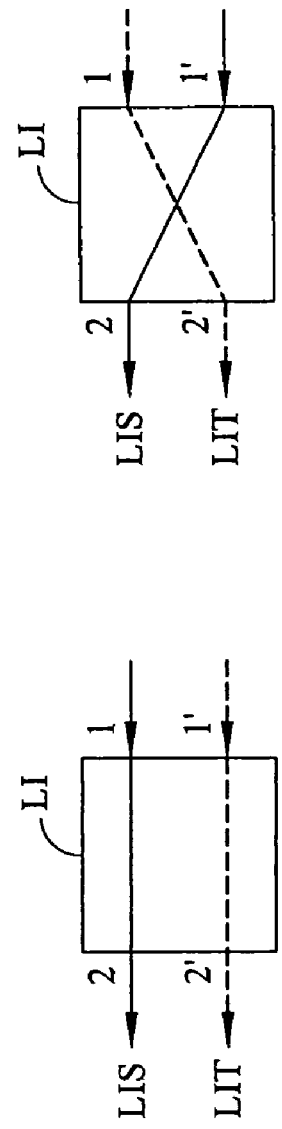
Figure 1C:
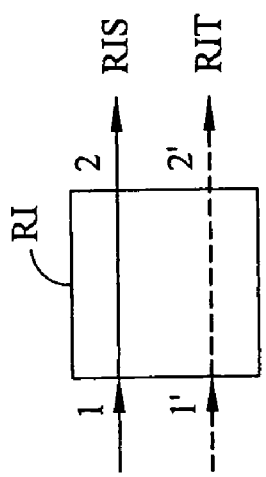
Figure 1C:
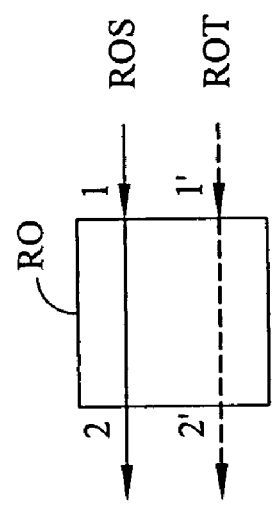
Figure 1D:
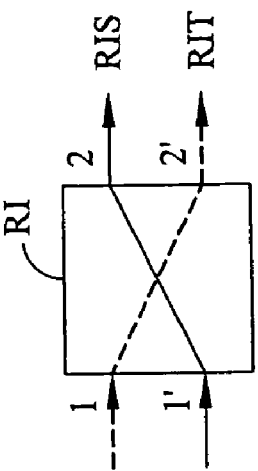
Figure 1D:
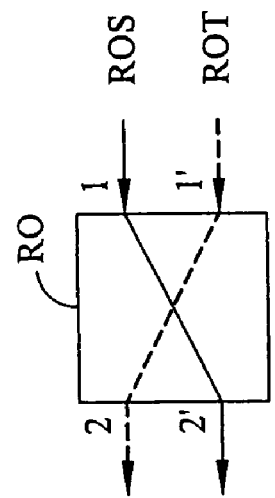
Figure 2A:
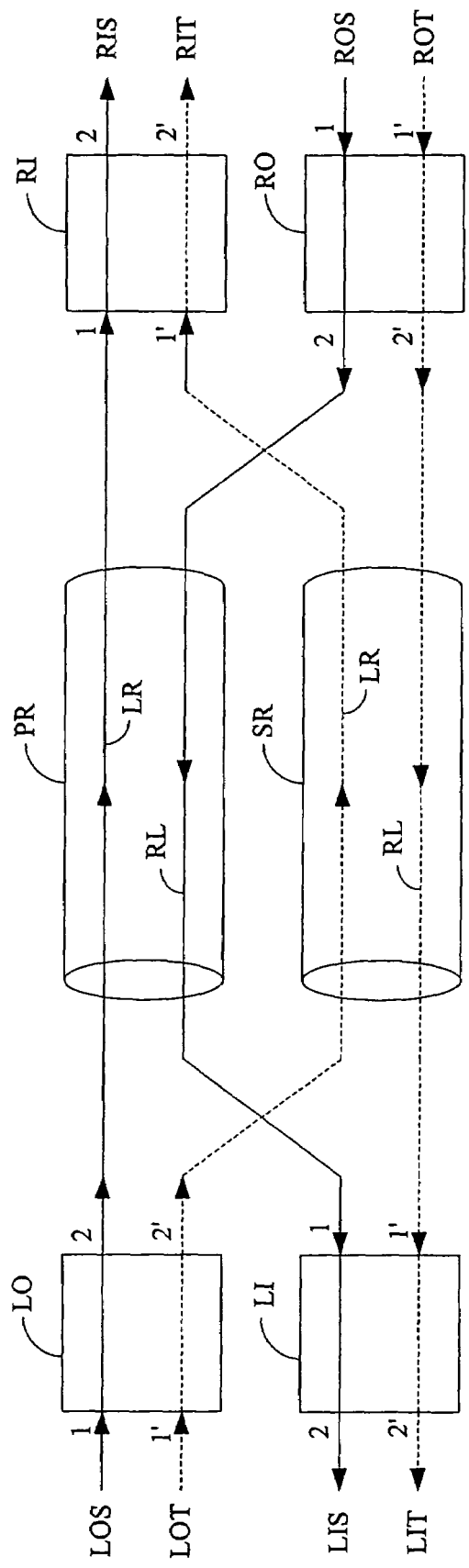
FIG. 2a is a diagram of the signal transmission path through the fiber optic cable in normal circumstances.
Figure 2B:
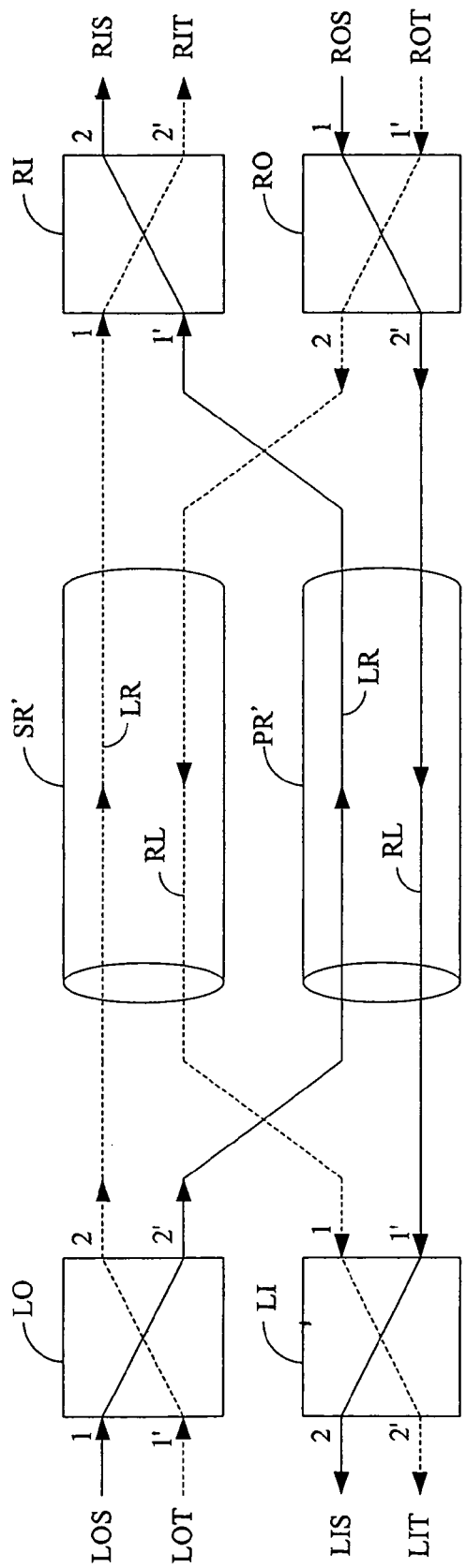
FIG. 2b is a diagram of the signal transmission path through the two fiber optic cable after switching over to the secondary channel.

Referring to FIGS. 2a, 2b, the architecture and operation principles of the present system are illustrated. The present system is formed by two subsystems, which are installed on two ends of the two bidirectional fiber channels, one end being referred to as (L) and other end as (R). It shall be noted that these notations are used to differentiate the two sides of the fiber channels arbitrarily, and with no sense to be interpreted as physical positions of the right and left sides.

The subsystem on each end is to include one front-end switch denoted as (LO) or (RO), depending on whether it is the L or R subsystem, and one back-end switch denoted as (RI) or (LI). The front-end switches LO and RO always use the first input port 1 to receive data signal denoted as LOS and ROS. The back-end switches RI and LI always use the first output port 2 to send out data signals denoted as LIS and RIS. It shall be noted that the arrangement and order of the input and output ports on the optical switches may be different, but this is not supposed to affect the operation of the optical switches in accordance with the present invention.

The communication line is set up with two parallel fiber channels, one of which is designated as the primary route (PR) and another one as the secondary route (SR). Each route is to include two opposite signal transmission paths represented by LR and RL. It shall be noted that the primary and secondary routes PR, SR can be implemented as two independent optical fiber cables or two fiber channels embedded in the same cable.

To monitor the operating conditions over the data channels, two input light sources are employed, one on each end L, R. The front-end switches LO, RO all use the second input port (1') to receive test signals denoted as LOT and ROT. Correspondingly, the back-end switches LI, RI use the second output port (2') to deliver test signals denoted as LIT and RIT.

In the normal operation mode, as shown in FIG. 2a, the signal transmission path LR in the primary route PR is connected between the first input port 1 of the front-end switch LO on one end and the first output port 2 of the back-end switch RI on the other end. The opposite signal transmission path RL in the primary route PR is connected between the first input port 1 of the front-end switch RO on one end and the first output port 2 of the back-end switch LI on the other end. Likewise, the signal transmission path LR in the secondary route SR is connected between the second input port 1' of the front-end switch LO on one end and the second output port 2' of the back-end switch RI on the other end. The opposite direction signal transmission path RL in the secondary route SR is connected between the second input port 1' of the front-end switch RO on one end and the second output port 2' of the back-end switch LI on the other end.

The front-end and back-end switches LI, LO, RO, and RI are all set up with appropriate operation modes. Every time when the switch enable signal is received, the data channel is switched from one to the other, respectively represented by (1-2, 1'-2') and (1-2', 1'-2), where a-b represents connection from port a to port b. In normal operation, the bi-directional signal transmission is carried out through the primary route PR. For example, signal transmission in one direction (indicated by continuous lines) along the signal transmission path LR of the primary route PR is represented by LOS->RIS, and the other direction signal transmission along the signal transmission path RL is represented by ROS->LIS.

The test signal transmission (indicated by broken lines) are carried out through the secondary route SR. For example, test signals in one direction are sent through the signal transmission path LR of the secondary route SR represented by LOT->RIT, and the other direction through the RL of the secondary route SR is represented by ROT->LIT. It shall be noted that the set up for the back-end and front-end switches shown in FIG. 2a is only one in several possible patterns. There are other possible connection patterns for the optical switches using the same architecture.

Referring to FIG. 2a, according to the present design, a pair of fiber optic power meters (not shown) are coupled onto the input ports 1, 1' of the front-end switch LI, and another pair on the input ports 1, 1' of the back-end switch RO. It is possible to detect any disconnection in either direction whether the signal transmission is carried out on the primary route PR or secondary route SR. For example, the power meter (not shown) installed on the first input port 1 of the left back-end switch LI detects breakdown of signal transmission over RL of the primary route PR, that means the power level of the transmitted signals is below a predetermined level. Thereafter, the control circuit is able to determine that RL of the primary route PR is currently disconnected. If the power meter (not shown) on the back-end switch RI detects any signal transmission breakdown over LR of the primary route PR, that means LR of the primary route PR is currently disconnected.

Likewise, the power meters on the second input port 1' of the back-end switches LI, RI are used to monitor signal transmission over the secondary route SR. When the power meter on second input port 1' of the back-end switch on one end of the secondary route SR detects the power level of transmitted test signals are below a predetermined level, the control circuit immediately issues an appropriate warning to the system operator indicating there is line disconnection, who will then check the status of the secondary route SR and have it fixed quickly. Later, when the power meter detects that the power level of the test signals over the secondary route SR is recovered, the control circuit immediately cancels the warning. For any line disconnection over LR or RL of the secondary route SR, the system will shut down LR or RL of the secondary route for repair immediately.

Following the above control logic, if line disconnection is detected over the primary route PR, the control circuit automatically shuts down the damaged channel, and issues appropriate warning to the system operators asking them to check into the problem immediately. Also, the control circuit issues an appropriate warning, and then embeds a switch enable signal in the LOT or ROT test signals that are transmitted over the secondary route SR to the other end of the same channel. Upon receiving the switch enable signal being carried by the test signals RIT or LIT, the control circuit automatically orders the local back-end and front-end switches to be switched over from the primary route PR to the secondary route SR. The power meter detecting the line disconnection also initiates a similar switch over from one channel to the other. The result is that signal transmission is successfully transferred from the primary route PR to the secondary route SR as shown in FIG. 2b (the continuous lines represent the data signal transmission paths, and the broken lines represent the test signal transmission paths).

In the switch-over operation mode, as shown in FIG. 2b, the signal transmission path LR in the primary route PR' is connected between the second output port 2' of the front-end switch LO on one end and the second input port 1' of the back-end switch RI on the other end. the opposite signal transmission path RL in the primary route PR' is connected between the second output port 2' of the front-end switch RO on one end and the second input port 1' of the back-end switch LI on the other end. Likewise, the signal transmission path LR in the secondary route SR' is connected between the first output port 2 of the front-end switch LO on one end and the first input port 1 of the back-end switch RI on the other end. the opposite direction signal transmission path RL in the secondary route SR' is connected between the first output port 2 of the front-end switch RO on one end and the first input port 1 of the back-end switch LI on the other end.

Referring to FIG. 2b, after switching over to the secondary route SR', the pair of fiber optic power meters (not shown) installed on the first input port 1 of the back-end switch LI or RI is unable to detect test signal LIT or RIT, because the primary route PR' is damaged. But once the LR or RL of the primary route PR' is repaired, the power meters on the first input port 1 of the left and right back-end switches LI, RI are able to detect test signals again, so the control circuit determines that the damaged LR or RL channel has been successfully repaired.

In the same manner that the back-end and front-end switches are switched over from the primary route to the secondary route as described in the above paragraphs, once the power meters on one end have successfully detected the test signals LOT or ROT, and once the control circuit from the other end has received the switch enable signal being carried by the test signals RIT or LIT, the control circuit is able to determine that a switch over is requested, so all local back-end and front-end switches are immediately switched back from the secondary route SR' to the primary route PR'. The power meters detecting the channel recovery also initiates the switch over of the back-end and front-end switches back to the original operation mode. The resultant signal transmission is the same as that shown in FIG. 2a, meaning that the signal transmission is returned to the primary route PR after the second automatic channel switching.

If the line disconnection occurs on LR and RL of the primary route PR at the same time, the above-mentioned automatic channel switching mechanism is capable of handling the situation, only that the power meters on two ends have to issue switch enable signals and initiate the switch over for all local back-end and front-end switches if a line disconnection is detected.

The present invention can be used on telecommunication systems coupled with fiber amplifiers, such as the erbium-doped fiber amplifiers (EDFA). The EDFA is an optical repeater that is used to increase the signal intensity being transmitted over the fiber channels, which are commonly used as repeater nodes in multi-section communication lines.

Figure 2C:
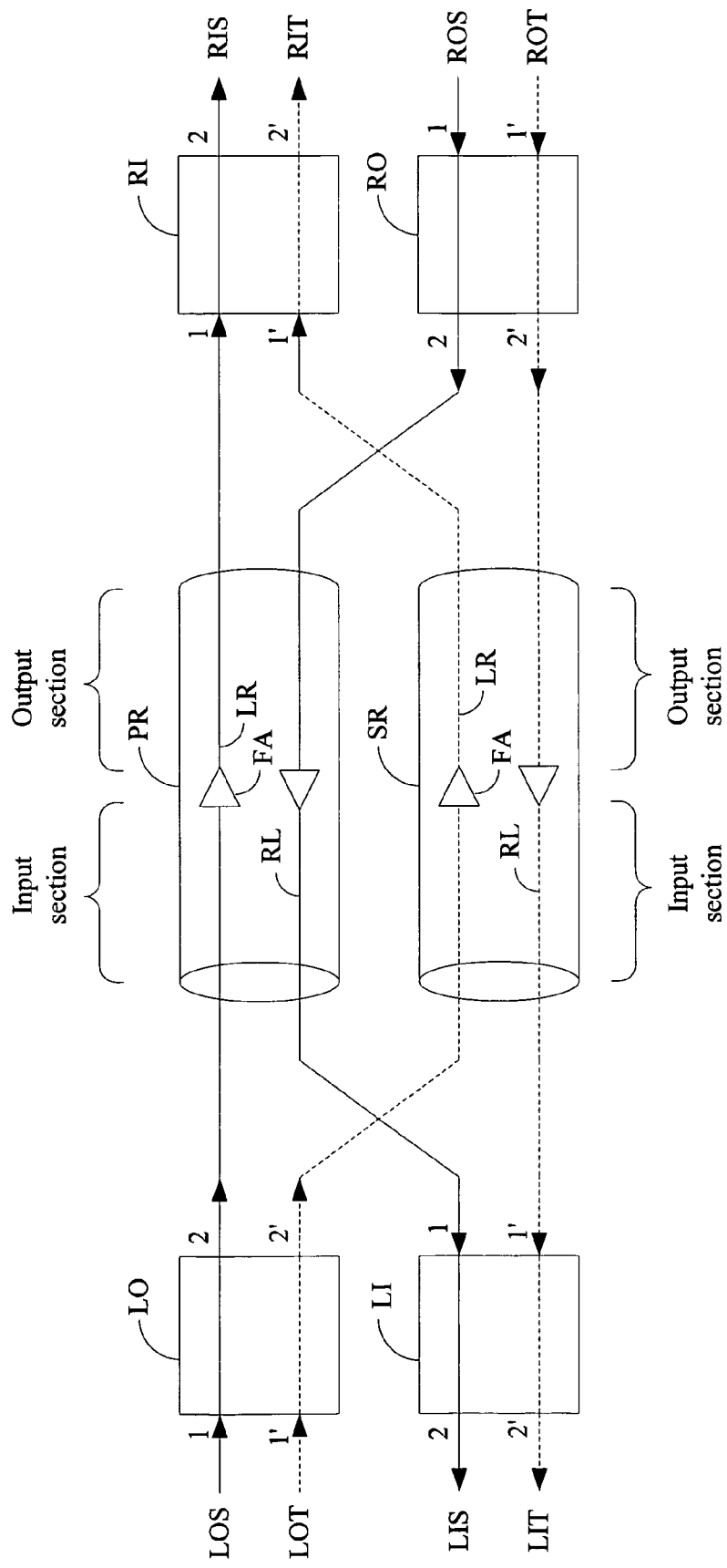
FIG. 2c is a diagram of the signal transmission path through the fiber optic cable coupled with fiber amplifiers operating in the normal circumstances.
Figure 2D:
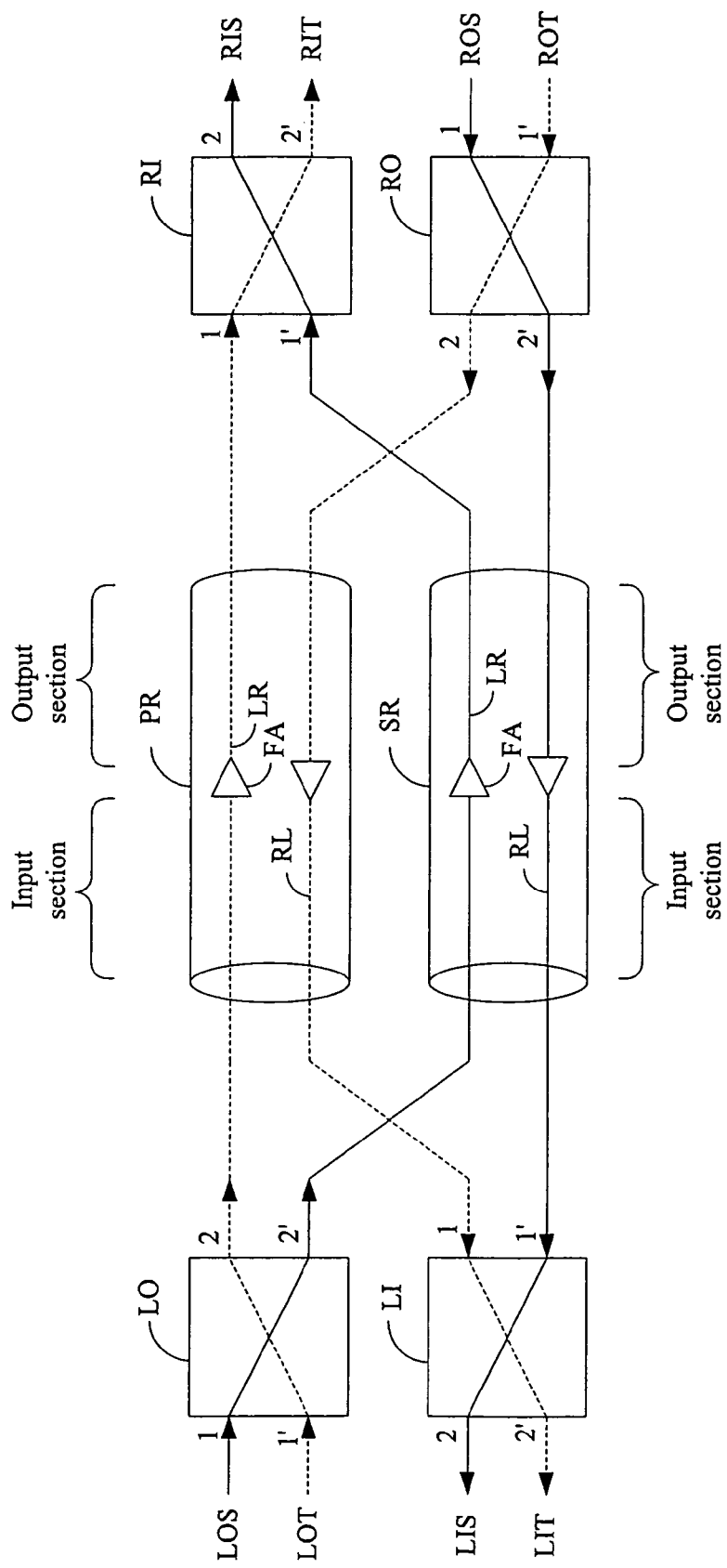
FIG. 2d is a diagram of the signal transmission path through the fiber optic cable shown in FIG. 2c after switching over to the secondary channel.

Referring to FIG. 2c, LR, RL signal transmission paths in the primary route PR and secondary route SR are connected with at least one fiber amplifier (FA). If the line disconnection occurs at the output section of any FA, because the signals cannot pass through, the system automatically switches over to the secondary channel. If the disconnection occurs at the input section of any FA, and the FA possesses automatic shutdown capability, the FA will be shutdown automatically, as shown in FIG. 2d. However, if the FA does not possess the automatic shutdown, following the control logic that has been described above, the control circuit will switch over the output section of the damaged FA. In sum, the signal transmission pattern through the fiber channels and the switch over will be very similar to those described in the previous examples shown in FIGS. 2a, 2b.

The left side subsystem, in two preferred embodiments of the invention, are illustrated to help explain the general framework and operation principles. The right side subsystem is a copy only that the connections to the signal transmission paths are reversed.

Figure 3A:
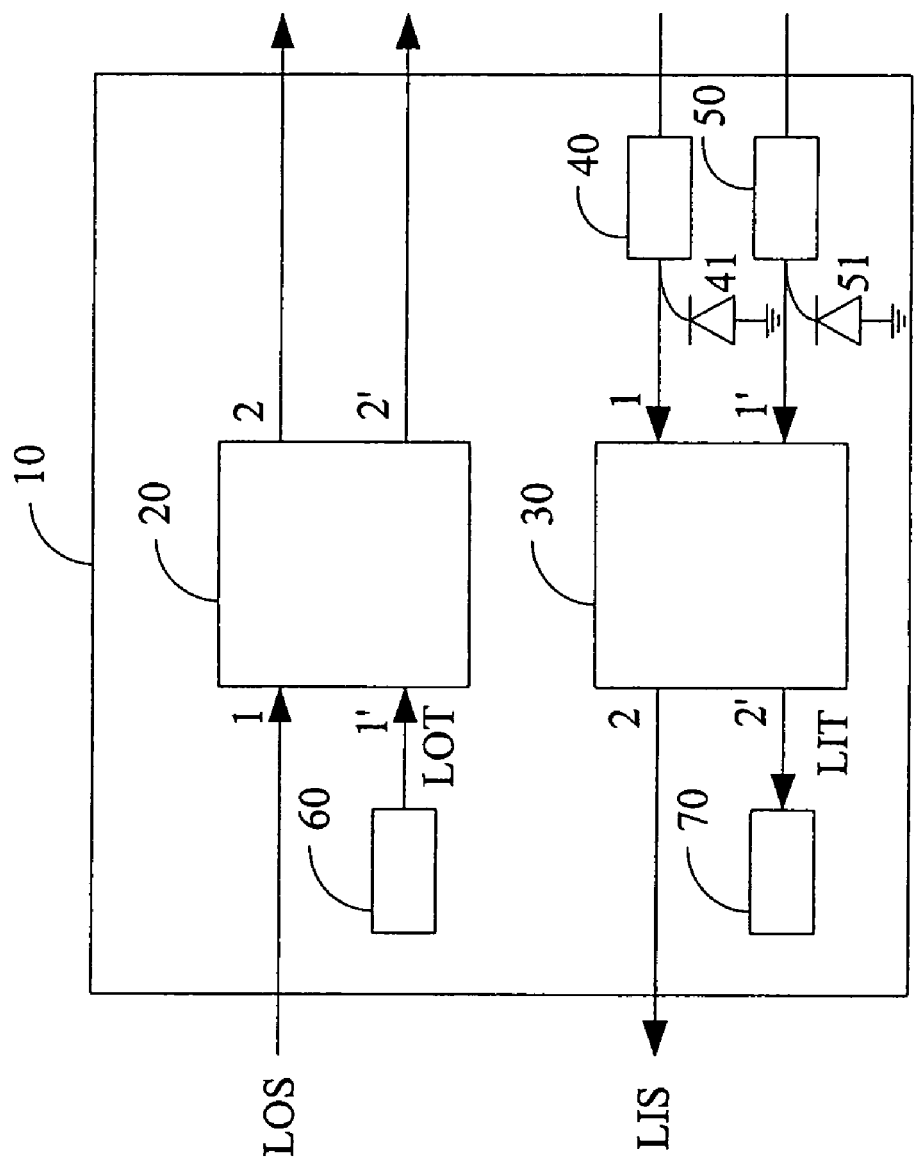
FIG. 3a is a diagram of an optical subsystem set up in accordance with the first preferred embodiment.

Referring to FIG. 3a, in accordance with the first preferred embodiment, the subsystem 10 includes a front-end switch 20, a back-end switch 30, and two power meters (not numbered) coupled onto input ports 1, 1' of the back-end switch 30. Each power meter is constructed with one optical splitter 40, 50 for splitting the light beam passing through and one photo diode 41, 51 for receiving the light beam. One input port of the front-end switch 20 is installed with an input light source 60 (laser diode) to provide the system with necessary test signals (LOT). One output port of the back-end switch 30 is coupled with one optical receiver 70 (photo diode) to detect the switch enable signal being carried by the input test signals (LIT).

It shall be noted that the photo diodes 41, 51, input light source 60, and optical receiver 70 are electrically connected to a control circuit (not shown) used for monitoring the power level of signals being transmitted over the working channel. If the power level of the transmitted signals is below a predetermined level, a switch enable signal is embedded in the test signals. The subsystem detecting the switch enable signal immediately switches over all local back-end and front-end switches 20, 30 from one operation mode to the other. The mechanics of the automatic channel switching have been adequately discussed previously, so please refer to the above paragraphs for the detailed process of channel switching.

Figure 3B:
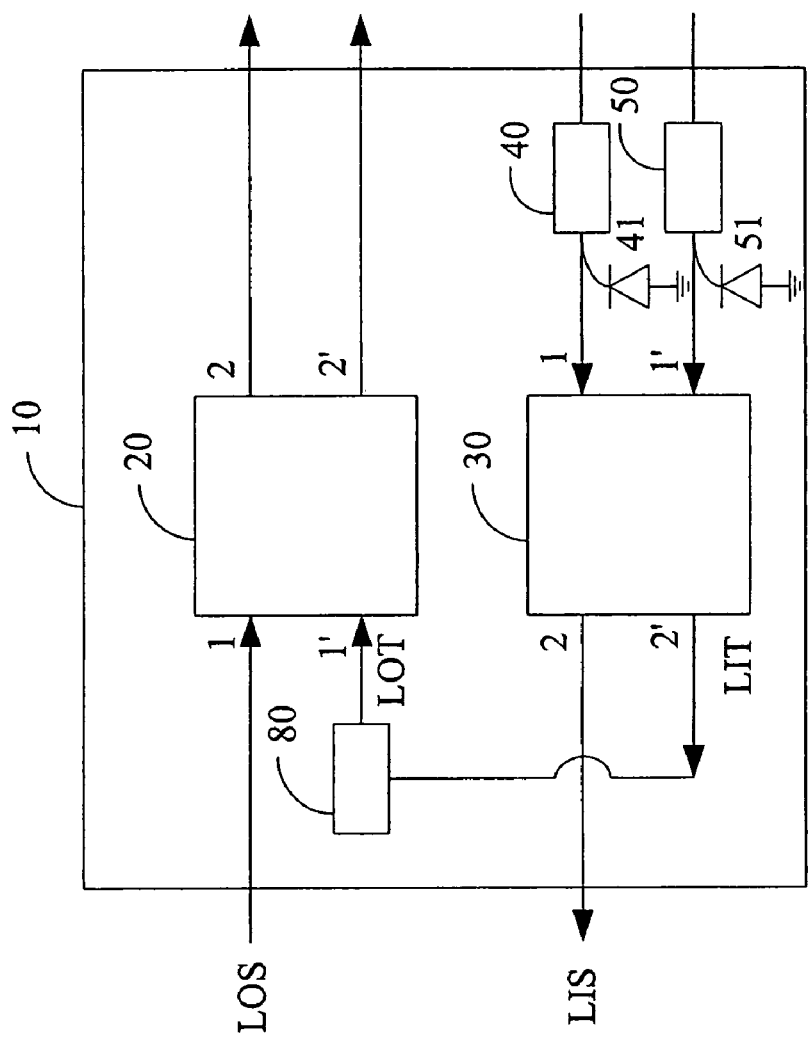
FIG. 3b is a diagram of another optical subsystem set up in accordance with the second preferred embodiment.

Referring to FIG. 3b, in accordance with the second preferred embodiment, the subsystem 10 includes a front-end switch 20, a back-end switch 30, and two power meters (not numbered) coupled on input ports 1, 1' of the back-end switch 30, same as in the previous example, but the original input light source and optical receiver are combined into one unit to form a transceiver 80, which is connected between the second input port 1' of the front-end switch 20 on one end and the second output port 2' of the back-end switch 30 on the other end. The input port of the front-end switch 20 provides the necessary test signals (LOT), and the output port of the back-end switch 30 is used to detect the switch enable signal being carried by the input test signals (LIT). Please refer to the previous paragraphs for the channel switching technique.

One of the advantages of the present invention is that the system ensures efficient and reliable optical telecommunication using two symmetrical fiber channels (one as a working channel and another as a spare channel), and be able to avoid the costly implementation with extra signal lines and the 'racing' problem with the switch lock scheme.

Although the present invention has been described with reference to the preferred embodiments thereof, it is apparent to those skilled in the art that a variety of modifications and changes may be made without departing from the spirit and scope of the present invention which is intended to be defined by the appended claims.

What is claimed is:

1. An optical telecommunication system with automatic channel switching, comprising at least two bi-directional symmetrical fiber channels being represented by primary route and secondary route, and two optical switches, being installed on each end of the primary route and secondary route, where each bi-directional fiber channel contains two opposite direction signal transmission paths, and the subsystem on each end includes:

a front-end switch and a back-end switch, each having a pair of input ports 1, 1' and a pair of output ports 2,2', and these two switches are built in with (1-2, 1'-2') and (1-2',1'-2) operation modes, wherein data signals are delivered over the data channel through the first input port 1 of the front-end switch, and retrieved from the other end through the first output port 2 of the back-end switch, and when line disconnection is detected over the current channel or when a switch enable signal is received from the other end, each local switch responds by switching over from one operation mode to the other;

an input light source being coupled onto the second input port 1' of the front-end switch to provide the necessary test signals;

an optical receiver being coupled onto the second output port 2' of the back-end switch to receive switch enable signal being carried by the input test signals from the other end;

two power meters being installed on the input ports 1, 1' of the back-end switch to monitor the power level of transmitted signals over the channel; and a control circuit, which is electrically connected to the back-end and front-end switches, input light source, optical receiver, and power meters;

wherein when in normal operation mode, one signal transmission path in the primary route is connected between the first input port 1 of the front-end switch on one end and the first output port 2 of the back-end switch; the opposite direction signal transmission path in the primary route is connected between the first input port 1 of the front-end switch on one end and the first output port 2 of the back-end switch on the other end; one signal transmission path in the secondary route is connected between the second input port 1' of the front-end switch on one end and the second output port 2' of the back-end switch on the other end; the opposite direction signal transmission path in the secondary route is connected between the second input port 1' of the front-end switch on one end and the second output port 2' of the back-end switch; and all back-end and front-end switches are built in with appropriate operation modes (1-2, 1'-2') and (1-2',1'-2), so that data signals are transmitted bi-directionally over the primary route, and test signals are transmitted bi-directionally through the secondary route;

when the power meter on second input port 1' of the back-end switch of the secondary route detects the power level of the test signals is below a predetermined level, the control circuit immediately issues a warning informing the system operator of line disconnection on the secondary route, when the power meter on second input port 1' of the receiving end switch of the secondary route detects the resumption of test signal transmission over the secondary route, the control circuit immediately cancels the previous warning; and when the power meter on first input port 1 of the back-end switch of the primary route detects the power level of the data signals is below a predetermined level, the control circuit immediately embeds a switch enable signal in the test signals being transmitted over the current channel to the other end; and when the switch enable signal is received on the other end the control circuit orders all local back-end and front-end switches to switch over to the other operation mode; and the control circuit detecting the line disconnection also initiates the switch over of all back-end and front-end switches to the other operation mode, so that the signal transmission path is successfully switched over to the secondary route; and when the power meter on first input port 1 of the back-end switch of the primary route detects the resumption of test signal transmission over the primary route, the control circuit again uses the above technique to switch all back-end and front-end switches back to the normal operation mode, so that the signal transmission is once again back to the primary route.

2. The optical telecommunication system as claimed in claim 1, wherein the primary route and secondary route are two independent fiber optic cables.

3. The optical telecommunication system as claimed in claim 1, wherein the primary route and secondary route are different channels in the same optic fiber cable.

4. The optical telecommunication system as claimed in claim 1, wherein the input light source and optical receiver are combined into one unit to form an optical transceiver.

5. The optical telecommunication system as claimed in claim 1, wherein each input light source is to include at least one laser diode.

6. The optical telecommunication system as claimed in claim 1, wherein each optical receiver is to include at least one photo diode.

7. The optical telecommunication system as claimed in claim 1, wherein each power meter is to include at least one optical splitter and one photo diode.

8. The optical telecommunication system as claimed in claim 1, wherein the bi-directional signal transmission path in primary route and secondary route each includes at least one fiber amplifier to be a repeater node in multi-section communication line.

9. The optical telecommunication system as claimed in claim 8, wherein each fiber amplifier is to possess automatic shutdown capability.

* * * * *